J. M. LARSEN.
TRANSMISSION MECHANISM FOR MOTOR VEHICLES.
APPLICATION FILED MAY 29, 1918.
1,313,392.
Patented Aug. 19, 1919.
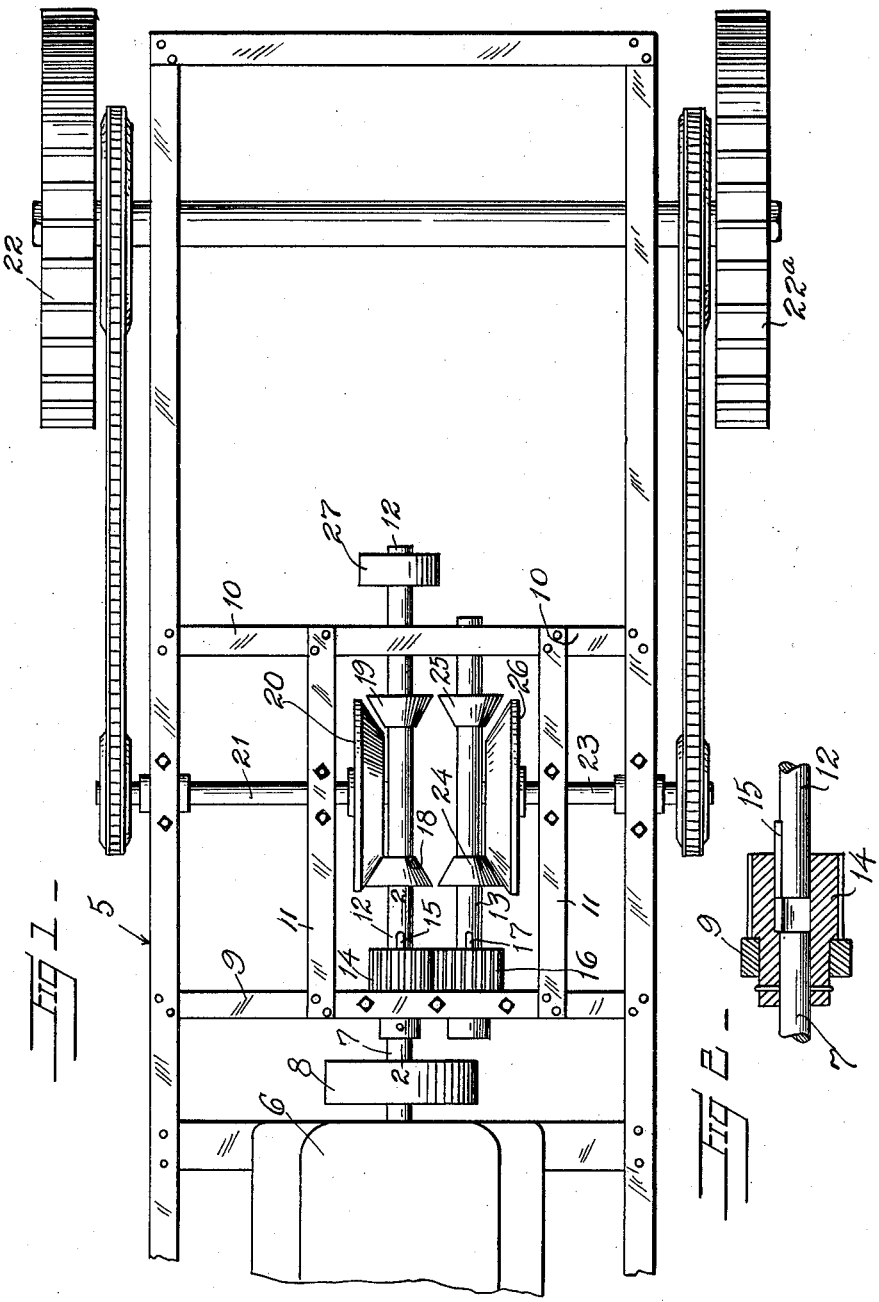
Inventor
James M. Larsen
By
Attorneys

UNITED STATES PATENT OFFICE.

JAMES M. LARSEN, OF CHICAGO, ILLINOIS.

TRANSMISSION MECHANISM FOR MOTOR-VEHICLES.

1,313,392.  Specification of Letters Patent.  Patented Aug. 19, 1919.

Application filed May 29, 1918. Serial No. 237,235.

*To all whom it may concern:*

Be it known that I, JAMES M. LARSEN, a citizen of the United States, residing at Chicago, in the county of Cook and State of Illinois, have invented new and useful Improvements in Transmission Mechanism for Motor-Vehicles, of which the following is a specification.

This invention relates to motor vehicles, and more particularly to the mechanism for connecting the power shaft to the drive wheels of the vehicle, the object of the invention being to provide a mechanism by the use of which the vehicle may be more easily steered, short turns being readily made. The mechanism is especially useful for tractors, although it is not limited to such type of motor vehicles, but may, with equal facility be applied to other motor vehicles.

In order that the invention may be better understood, reference is had to the accompanying drawing forming a part of this specification, and in said drawing, Figure 1 is a plan view of the mechanism, and Fig. 2 is a sectional detail on the line 2—2 of Fig. 1.

Referring specifically to the drawing, 5 denotes a fragment of the frame of a tractor or other motor vehicle driven by an engine 6, which latter may be an internal-combustion engine, on the shaft 7 of which is a fly wheel 8. These parts may all be constructed and arranged in a suitable manner and nothing claimed therefor.

At the rear portion of the frame 5 are two cross frame members 9 and 10 respectively connected by longitudinal frame members 11. The frame members 9 and 10 support two parallel shafts 12 and 13 respectively, the shaft 12 being in axial alinement with the power shaft 7, and on the rear end of the power shaft is made fast a pinion 14 having a hub of sufficient length so that the forward end of the shaft 12 may extend thereinto. By means of a key or spline 15, the shaft 12 is connected to the pinion 14 to turn therewith, and said shaft is also slidable in the direction of its length without becoming uncoupled from the pinion.

The frame members 9 and 10 also support the shaft 13, suitable bearings being provided. This shaft is also slidable in the direction of its length, and on its inner end is a pinion 16 which is constantly in mesh with the pinion 14. A spline or other suitable connection 17 is provided between the shaft 13 and the pinion 16, so that said parts may turn together, and the shaft may be moved in the direction of its length without being uncoupled from the pinion.

On the shaft 12 are oppositely turned beveled friction wheels 18 and 19 respectively, adapted to be brought alternately into driving contact with a friction disk 20 on a counter shaft 21, by sliding the shaft 12, the shaft 21 being operatively connected to one of the traction wheels 22 of the vehicle by means of a sprocket-and-chain or other suitable gearing. The other traction wheel 22$^a$ is driven from a countershaft 23 in axial alinement with the countershaft 21. On the shaft 13 are friction wheels 24 and 25, respectively, adapted to be brought alternately into driving contact with a friction disk 26 on the countershaft 23, by sliding the shaft 13.

The motion of the power shaft 7 is transmitted through the pinion 14 to the shaft 12, and said pinion also transmits motion to the shaft 13 through the pinion 16. The motion of the shafts 12 and 13 is transmitted by the friction gearing hereinbefore described to the countershafts 21 and 23, and the latter, in turn transmit motion to the wheels 22 and 22$^a$.

When the friction wheels 18 and 24 are in driving contact with the disks 20 and 26, a forward drive is obtained, and to obtain a reverse drive, the shafts 12 and 13 are shifted to disengage said friction wheels and to bring the friction wheels 19 and 25 into driving contact with the friction disks. When all the friction wheels are out of contact with the friction disks, the gearing is in neutral position, and no motion is transmitted to the traction wheels 22 and 22$^a$. One of the traction wheels can also be thrown in gear, with the other out of gear, to facilitate turning of the tractor, a very short turn being thus rendered possible, and this can also be done by setting the gearing so that both traction wheels are driven in opposite directions.

Any suitable means may be provided for shifting the shafts 12 and 13, and as this is immaterial, it has not been illustrated. The rear end of the shaft 12 is shown equipped with a pulley 27 so that the tractor may be used for stationary engine service.

I claim:

A transmission gearing for motor vehicles, comprising in combination with the power shaft, a pair of longitudinally slidable shafts, a pinion fast on the power shaft, said pinion having a hub extension to receive one end of one of the slidable shafts, and said shaft being splined to the pinion to turn therewith, a pinion on the other slidable shaft and in mesh with the other pinion, a pair of oppositely facing friction wheels on each slidable shaft, a pair of countershafts operatively connected to the respective drive wheels of the vehicle, and a friction disk on each countershaft, one friction disk being engageable by one pair of the aforesaid friction wheels, and the other friction disk being engageable by the other pair of the friction wheels, said friction wheels being alternately engageable with the respective friction disks by shifting the slidable shafts in the direction of their length.

In testimony whereof I affix my signature.

JAMES M. LARSEN.

Copies of this patent may be obtained for five cents each, by addressing the "Commissioner of Patents, Washington, D. C."